United States Patent

Watanabe

[11] Patent Number: 6,149,317
[45] Date of Patent: Nov. 21, 2000

[54] INFORMATION PROVIDING APPARATUS AND METHOD HAVING IMAGE RETRIEVING FUNCTION

[75] Inventor: Ikuo Watanabe, Yokohama, Japan

[73] Assignee: Canon Kabushiki Kaisha, Tokyo, Japan

[21] Appl. No.: 08/772,582

[22] Filed: Dec. 26, 1996

Related U.S. Application Data

[63] Continuation of application No. 08/641,631, May 2, 1996, abandoned, which is a continuation of application No. 08/160,154, Dec. 2, 1993, abandoned.

[30] Foreign Application Priority Data

Dec. 4, 1992 [JP] Japan .................................... 4-350831

[51] Int. Cl.[7] .................................................. G06F 13/14
[52] U.S. Cl. ............................................................ 395/427
[58] Field of Search ..................... 364/DIG. 1 MS File, 364/DIG. 2 MS File; 395/613, 614, 615, 610, 616, 200.01, 427, 477, 580, 600

[56] References Cited

U.S. PATENT DOCUMENTS

5,265,065  11/1993  Turtle ...................................... 395/600

Primary Examiner—Robert B. Harrell
Attorney, Agent, or Firm—Fitzpatrick, Cella, Harper & Scinto

[57] ABSTRACT

An information providing apparatus for selecting desired information from a plurality of storing media and outputting the selected information to a terminal apparatus comprises an input unit to input information requests from a plurality of terminal apparatuses, a deciding unit for classifying the plurality of information requests inputted by the input unit and deciding a retrieving order of the information according to each information request, a memory to store the retrieving order decided by the deciding unit, a reading unit for selecting the storing medium corresponding to the information request from the plurality of storing media in accordance with the retrieving order stored in the memory and for reading out the desired information, and an output unit to output the information read out by the reading means to the terminal apparatus. The memory stores the ID number of the storing medium, the ID number of the information, and the ID number of the terminal apparatus as one set.

20 Claims, 3 Drawing Sheets

INFORMATION PROVIDING APPARATUS AND METHOD HAVING IMAGE RETRIEVING FUNCTION

This application is a continuation of application Ser. No. 08/641,631, filed May 2, 1996, now abandoned, which is a continuation of application Ser. No. 08/160,154, filed Dec. 2, 1993, now abandoned.

BACKGROUND OF THE INVENTION

1. Field of the Invention

The invention relates to an information providing apparatus for enclosing a plurality of storing media and outputting information read out from an arbitrary storing medium.

2. Related Background Art

Hitherto, there has been provided an image information providing apparatus such as an automatic changer or the like comprising: a container to enclose a plurality of storing media; a storing medium carrying (conveying) unit; a reproduction unit of image information; terminal apparatuses; and a control unit.

In such an image information providing apparatus, the storing medium in the storing medium container is moved to the reproduction unit by the storing medium conveying unit on the basis of a request from the terminal apparatus, the image stored in the storing medium is reproduced by the reproduction unit, and a desired image is provided to the terminal apparatus.

In the above conventional technique as mentioned above, in the case where a plurality of users operate the terminals and generate requests, there is a problem that it takes a very long time (about 10 seconds) until a desired image is provided to the user's own terminal apparatus and the apparatus cannot promptly cope with the request of the user.

Particularly, in case of reproducing the images from a plurality of storing media, each time the reproducing operation is executed, the storing medium is unmounted or mounted into the reproduction unit, so that the total waiting time of the users is extremely long.

SUMMARY OF THE INVENTION

It is an object of the invention to provide an information providing apparatus which can eliminate the above drawbacks.

Another object of the invention is to provide an information providing apparatus and method which has an excellent response speed to a request from a user and in which the user can efficiently obtain desired information.

Still another object of the invention is to provide an information providing apparatus and method in which a plurality of received requests are classified for every storing medium, thereby enabling information to be efficiently read out.

The above and other objects and features of the present invention will become apparent from the following detailed description and the appended claims with reference to the accompanying drawings.

DETAILED DESCRIPTION OF THE PREFERRED EMBODIMENTS

Figure 1:
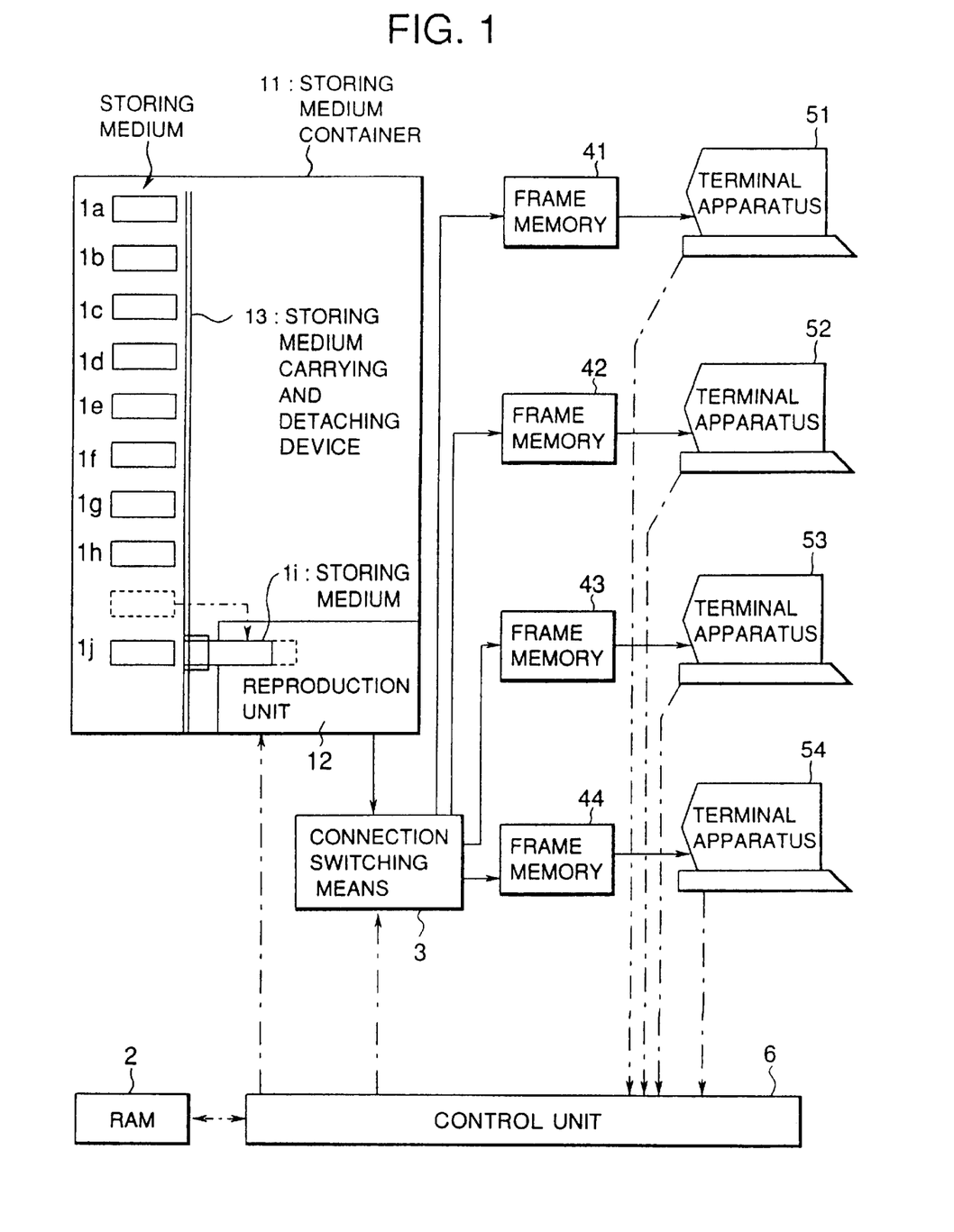
FIG. 1 is a block diagram showing the first embodiment of the invention.

FIG. 1 is a block diagram showing the first embodiment of the invention.

An information providing apparatus 1 of the embodiment comprises: a storing medium container 11 enclosing a number of storing media 1a to 1j; storing medium carrying and detaching device 13 for carrying each storing medium from the container 11 to an image reproduction unit 12 and for detaching the storing medium; a RAM 2 to store identification (ID) information of the image information requested from a terminal apparatus; connection switching device 3 to switch the connection of the image which is reproduced by the image reproduction unit 12; terminal apparatuses 51 to 54 each of which is constructed by a monitor such as a CRT display or the like and an operation unit for the user to perform the operation for request; frame memories 41 to 44 provided for the terminal apparatuses 51 to 54; and control unit 6 for controlling the whole operation of each of the above component elements.

As a storing medium enclosed in the container 11, a magnetic tape, a magnetic disk, a magnetooptic disk, an optical disc, a semiconductor memory, or the like can be used. All of many kinds of image information which is desired by each user has been stored in each of the storing media.

The operation of the information providing apparatus will now be described.

(1) In the initial state, first, all of the storing media 1a to 1j are mounted into the reproduction unit 12 and are enclosed in the storing medium container 11.

(2) It is now assumed that the user sent request information of the following desired image information to the control unit 6 from the operation unit of the terminal apparatus 51.

No. 38 of the storing medium 1i,

No. 5 of the storing medium 1j,

No. 10 of the storing medium 1i (3) In response to the above request information, the control unit 6 forms a map indicative of the following relation between the retrieving order and the request terminals into the RAM 2.

No. 10 of 1i: terminal 51

No. 38 of 1i: terminal 51

No. 05 of 1j: terminal 51

In case of the embodiment, the retrieving order was determined by sorting on the basis of the storing media and the image numbers.

(4) Subsequently, the control unit 6 loads and mounts the storing medium 1i into the reproduction unit 12 in accordance with the order in the map registered in the RAM 2 and switches the connection switching unit 3 to the terminal apparatus 51. The image is reproduced from the storing medium and written into the frame memory 41. Thus, the desired image of the user is displayed on the terminal apparatus 51. FIG. 1 shows a state at that time point.

The control unit 6 subsequently allows the reproduction unit 12 to read out the 38th image of the storing medium 1i and stores the read-out image information into the frame memory 41. The control unit 6 loads and mounts the storing medium 1*j* into the reproduction unit 12 in place of the storing medium 1*i* and reproduces the fifth image information and stores into the frame memory 41. When the user of the terminal apparatus 51 inputs an instruction to request the next image, the 38th image of 1*i* in the storing medium is read out from the frame memory 41 and displayed.

Each of the frame memories 41 to 44 can store the images of a plurality of frames. It is also possible to construct the apparatus in a manner such that a capacity of the frame memory is set to a value of one frame and another storing device is provided and the images of a plurality of frames reproduced are stored into such a storing device and the image to be displayed is stored into the frame memory.

Processes in the case where there is a request from another terminal during the retrieval of the image corresponding to the request from one terminal apparatus will now be described.

(5) It is now assumed that the user sent the request information of the following desired images to the control unit 6 from the operation unit of the terminal apparatus 52.

No. 40 of 1*b*, No. 5 of 1*d*, No. 20 of 1*i*

(6) The control unit 6 sequentially merges the request information from the terminal apparatus 52 into the map in the RAM 2. The map indicative of the retrieving order is formed as follows.

No. 10 of 1*i*: terminal 51

No. 20 of 1*i*: terminal 52

No. 38 of 1*i*: terminal 51

No. 05 of 1*j*: terminal 51

No. 40 of 1*b*: terminal 52

No. 05 of 1*d*: terminal 52

Namely, since the storing medium 1*i* has been mounted into the reproduction unit 12, even if a request is generated later, the request to the same storing medium is preferentially registered.

(7) After completion of the reproduction of the 10th image in the storing medium 1*i*, the control unit 6 deletes the registration of "No. 10 of 1*i*: terminal 51" and switches the connection switching device 3 to the terminal 52 in accordance with the registration of the next map and reproduces the 20th image in 1*i* and writes into the frame memory 42. Thus, the desired image of the user is displayed on the terminal apparatus 52.

(8) By executing similar operations after that, the desired images of the user are sequentially displayed in accordance with the registration in the map.

Further, in the case where there is a request to the same image is generated from a plurality of terminals, the connection switching means 3 is controlled so as to simultaneously or sequentially send the same image to a plurality of terminals which requested and the image is reproduced, thereby enabling the reproducing time to be reduced.

In the above embodiment, a plurality of images have been stored on the terminal side. However, there is a drawback in that the terminal apparatus is expensive. The second embodiment which can solve a drawback will now be described.

When a predetermined time elapses after one image was reproduced and stored into the frame memory, the control unit 6 automatically reproduces the next image registered in the map and stores into the frame memory. In this instance, the images which have already been stored so far in the frame memory are deleted. When the operator of the terminal apparatus wants to see the next image before the elapse of the predetermined time, by inputting an instruction from the terminal apparatus, the control unit 6 starts the reproducing operation of the next image. In the case where the operator wants to continue the display of the same image even after the elapse of the predetermined time, by inputting an instruction from the terminal apparatus, the control unit 6 preferentially responds to the requests from the other terminal apparatuses which have already been registered in the map.

In the case where the next request registered in the map is a request from the different terminal apparatus, the control unit 6 immediately executes the reproduction of the image corresponding to the next request without waiting for the elapse of the predetermined time.

Consequently, even when the capacity of the frame memory on the terminal apparatus side is set to the value corresponding to one frame, the image can be efficiently retrieved.

Figure 2:
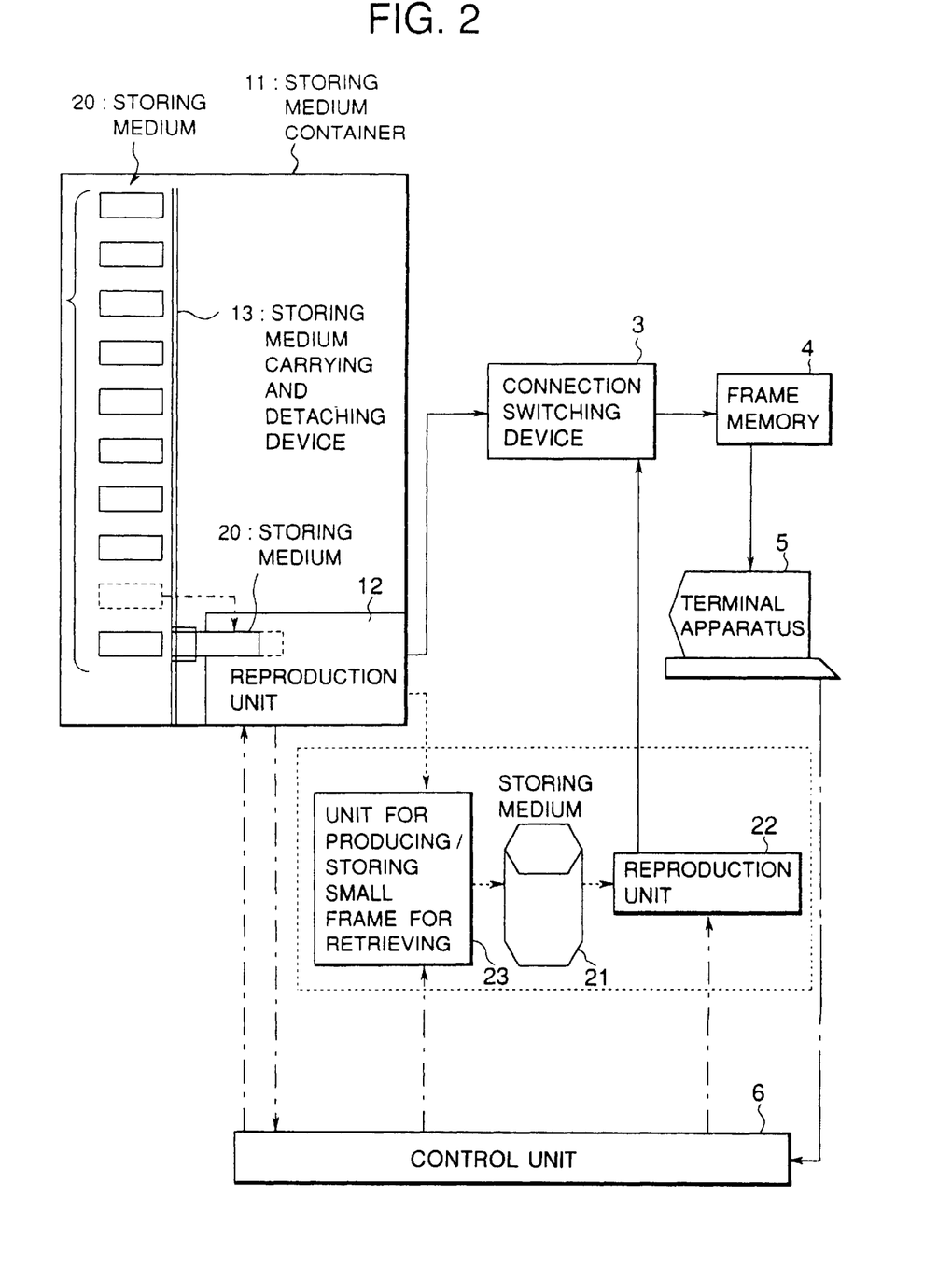
FIG. 2 is a block diagram showing the second embodiment of the invention.

FIG. 2 is a block diagram showing the second embodiment of the invention.

The image information providing apparatus. 1 in the second embodiment comprises: the storing medium container 11 in which first storing media 20 have been enclosed; the storing medium carrying and detaching device 13 for carrying each storing medium 20 from the container 11 to the image-reproduction unit 12 and for detaching the storing medium 20; a unit for producing/storing small frame for retrieving 23 for forming a small frame for retrieval and for storing into the second storing media 21; a reproduction unit 22 to reproduce the small frame for retrieving stored in the second storing medium 21; the connection switching device 3 for switching the connection of the image which is reproduced by the image reproduction unit 12; a terminal apparatus 5 which is constructed by a monitor such as a CRT display or the like and an operation unit for the user to perform the operation to request; a frame memory 4 provided for the terminal apparatus 5; and the control unit 6 for controlling the whole operation of each of the component elements.

As a first storing medium 20, a medium similar to the storing media 1*a* to 1*i* in the first embodiment is used. On the other hand, as a second storing medium 21, a magnetic disk, a magnetooptic disk, an optical disc, a semiconductor memory, or the like is used. The small images for retrieval regarding the image information stored in all of the first storing media 20 enclosed in the container 11 are recorded.

The operation in the retrieving operation in the construction as mentioned above will now be described. A flow of signals in the retrieving operation is shown by signal lines of solid line arrows.

(1) First, the retrieval picture plane request information which is desired by the user is sent to the control unit 6 from the operation unit of the terminal 5.

(2) The control unit 6 sends a reproducing instruction of the small picture plane for retrieval corresponding to the retrieval picture plane request information to the reproduction unit 22.

(3) The control unit 6 sends an instruction to select the input from the reproduction unit 22 to the connection switching device 3.

(4) The data of a plurality of small picture planes for retrieval stored in the second storing medium 21 of a high accessing speed is immediately written into the frame memory 4 by the reproduction unit 22 and is displayed on the terminal apparatus and is provided to the user.

The operation in the ordinary image reproducing mode will now be described. A flow of the signal upon reproduction is also shown by signal lines of solid line arrows in FIG. 2.

(1) The user sends the ordinary picture plane request information to the control unit 6 in order to reproduce desired image candidates found out upon retrieval.

(2) The control unit 6 sends a reproducing instruction of the ordinary picture plane corresponding to the ordinary image request information to the reproduction unit 12.

(3) The control unit 6 sends an instruction to select the input from the reproduction unit 12 to the connection switching device 3.

(4) The data of the ordinary picture plane from the reproduction unit 12 is written into the frame memory 4 and is displayed on the terminal apparatus 5.

(5) The user sees the image displayed on the terminal apparatus 5. When it is a desired image, the user executes a process such as to obtain a hard copy or the like by recording device or the like (not shown). In the case where the displayed image is not the desired image, the user again repeats the operation from the retrieving operation.

The operation when the storing medium is exchanged will now be described. A flow of signals at the time of exchange of the storing medium is shown by signal lines by arrows of broken lines in FIG. 2.

(1) First, the system manager (there is also a case where the user also manages the system) exchanges the storing medium 20.

(2) The control unit 6 detects that the storing medium 20 was exchanged.

(3) The control unit 6 deletes the data of the small frame for retrieval of the storing medium which was exchanged and deleted in the data stored in the storing medium 21.

(4) The storing medium 11 which was newly enclosed in the container 11 is mounted into the reproduction unit 12 and is reproduced. The small image for retrieval is formed by the storing unit 23 while executing a process such as elimination of moire or the like and is stored into the storing medium 21.

A method of forming the small frame for retrieval will now be described.

For example, a method of reducing the image data into ⅛ (data amount is reduced into 1/64) in both of the vertical and lateral directions will now be described with reference to FIGS. 3 and 4.

(1) To form a reduced frame from the data of the original image, the pixels comprising eight samples in each of the vertical and lateral directions are selected. Such a pixel is hereinafter referred to as a reduced pixel (shown by * in FIG. 3).

Figure 3:
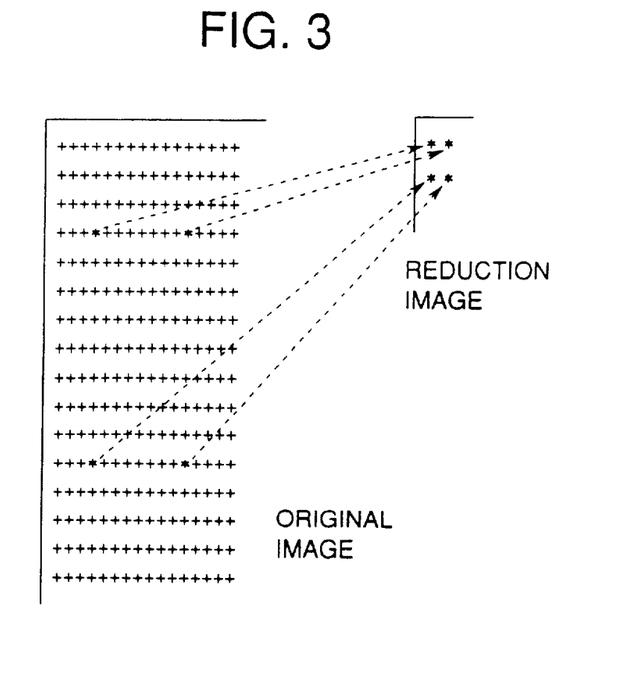
FIG. 3 is a schematic diagram for explaining a method of forming small frames for retrieving in the second embodiment.
Figure 4:
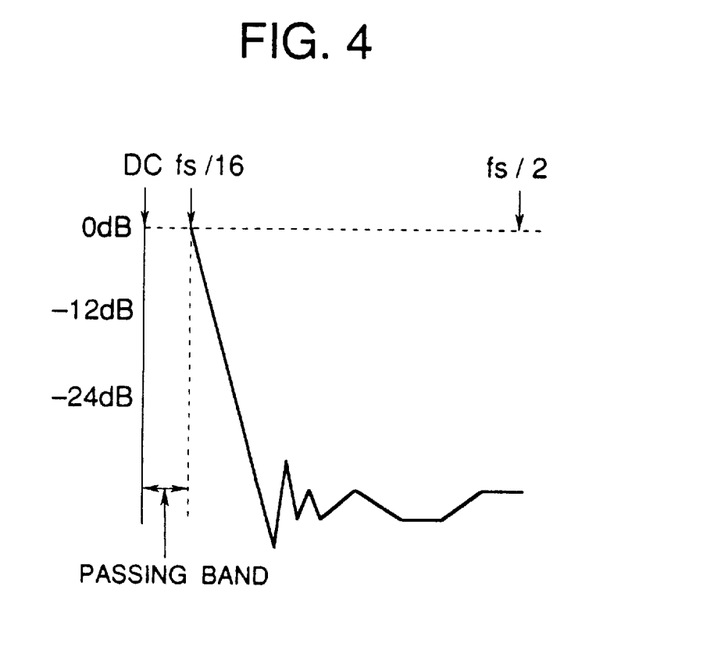
FIG. 4 is a schematic diagram for explaining low pass filter characteristics to form small frames for retrieving in the second embodiment.

(2) The image data is transmitted to a low pass filter for smoothing while setting the reduced pixel of the original image shown in FIG. 3 as a center. It is desirable that the low pass filter has characteristics of a filter in which a passing band lies within a range from DC to fs/16 that is equal to ⅛ of fs/2 as shown in FIG. 4 (fs: sampling frequency).

(3) Only the reduced pixels are collected, thereby forming a small frame for retrieving.

The above second embodiment has been shown and described with respect to the case where the control unit 6 automatically forms the small frame for retrieving when the recording medium is exchanged. However, the system manager or the user can also manually form the small frame for retrieving.

As described above, in the case where a plurality of image requests exist, by rearranging the accessing order on a storing medium unit basis, the number of mounting and unmounting times of the storing medium can be reduced. There is an effect that the user can promptly retrieve the desired image.

By also rearranging the accessing order in the storing medium, on the other hand, particularly, in the case where a magnetic tape is used as a storing medium such that the accessing speed in case of sequentially accessing is remarkably high, a still larger effect can be expected.

In the case where the small frames for retrieval corresponding to the first storing medium group in which each ordinary image was recorded are formed when the storing medium is exchanged or the like and recorded into the second storing medium, there is an effect such that the user can promptly retrieve the desired image without making the system manager troublesome.

The present invention is not limited to the foregoing embodiments but many modifications and variations are possible within the spirit and scope of the appended claims of the invention.

What is claimed is:

1. An information providing apparatus for selecting desired information from a plurality of storing media and outputting the selected information, comprising:

input means for inputting information requests from a plurality of terminal apparatuses;

deciding means for classifying the information requests inputted via said input means according to storing medium and for deciding a retrieving order in which information is to be retrieved, according to each of the information requests;

memory means for storing the retrieving order decided by said deciding means;

reading means for selecting a storing medium, from among the plurality of storing media, corresponding to each information request in turn, in accordance with the retrieving order stored in said memory means, and, for each information request, for reading out the desired information; and output means for outputting the information read out by said reading means to whichever of the plurality of terminal apparatuses originated that information request.

2. An apparatus according to claim 1, wherein said memory means stores the retrieving order by storing, as one set, an identification number of a storing medium from among the plurality of storing media which contains information requested by a particular one of the information requests, an identification number of the information requested by that information request, and an identification number of the terminal apparatus that originated that information request.

3. An apparatus according to claim 1, wherein said deciding means decides the retrieving order in such a manner that the information requests for information stored in a given storing medium from among the Plurality of storing media occur one after another without intervening information requests for information from others of the plurality of storing media, irrespective of particular kinds of terminal. apparatuses originated the information requests for that storage medium.

4. An information providing method for selecting desired information from a plurality of storing media and outputting the selected information, comprising the steps of:

inputting information requested from a plurality of terminal apparatuses;

classifying the information requests inputted in said inputting step according to storing medium and deciding a retrieving order in which information is to be retrieved, according to each of the information requests;

storing the retrieving order so decided;

selecting a storing medium, from among the plurality of storing media, corresponding to each information request in turn, in accordance with the retrieving order, and, for each information request, reading out the desired information; and outputting the information read out to whichever of the plurality of terminal apparatuses originated that information request.

5. A method according to claim 4, wherein the retrieving order is stored by storing, as one set, an identification number of a storing medium from among the plurality of stsoring media which contains information requested by a particular one of the information requests, an identification number of the information requested by that information request, and an identification number of the terminal apparatus that originated that information request.

6. A method according to claim 4, wherein the retrieving order is decided in such a manner that the information requests for information stored in a given storing medium from among the plurality of storing media occur one after another without intervening information requests for information from others of the plurality of storing media, irrespective of particular kinds of terminal apparatuses originated the information requests for that storage medium.

7. An information providing apparatus for selecting desired information from a plurality of storing media and outputting the selected information, comprising:

input means for inputting information requests;

deciding means for classifying the information requests inputted via said input means according to storing medium and for deciding a retrieving order in which information is to be retrieved, according to each of the information requests;

memory means for storing the retrieving order decided by said deciding means;

reading means for selecting a storing medium, from among the plurality of storing media, corresponding to each information request in turn, in accordance with the retrieving order stored in said memory means, and, for each information request, for reading out the desired information; and output means for outputting the information read out by said reading means to the terminal apparatus.

8. An apparatus according to claim 7, wherein said memory means stores an identification number of the storing medium.

9. An apparatus according to claim 7, wherein said deciding means decides the retrieving order so that the information requests for information stored in a same storing medium are arranged continuously.

10. An information providing method for selecting desired information from a plurality of storing media and outputting the selected information, comprising the steps of:

inputting information requests from a terminal apparatus;

classifying the information requests inputted in said inputting step according to storing medium and deciding a retrieving order in which information is to be retrieved, according to each of the information requests;

storing the retrieving order so decided;

selecting a storing medium, from among the plurality of storing media, corresponding to each information request in turn, in accordance with the retrieving order, and, for each information request, reading out the desired information; and outputting the information read out to terminal apparatus.

11. A method according to claim 10, wherein said storing step stores an identification number of the storing medium.

12. A method according to claim 10, wherein said deciding step decides the retrieving order so that the information requests for information stored in a same storing medium are arranged continuously.

13. An information providing apparatus comprising:

enclosing means in which a plurality of storing media are enclosed;

taking-out means for taking out a desired storing medium from said enclosing means;

reading means for reading out information from the storing medium taken out by said taking-out means;

deciding means for receiving information requests from a plurality of terminal apparatuses, for classifying, for each storing medium, identification information of desired information and identification information of terminal apparatuses, and for deciding a retrieving order of the information;

memory means for storing the retrieving-order decided by said deciding means; and control means for controlling said taking-out means and said reading means in accordance with the retrieving order stored in said memory means and for allowing retrieved information to be sequentially transmitted to a terminal apparatus which originated an information request for that retrieved information.

14. An information providing apparatus for selecting desired information from a plurality of storing media and for outputting the selected information, comprising:

deciding means for inputting information requests from a plurality of terminal apparatuses, for classifying the information requests according to storing mediums and for deciding a retrieving order of the information;

memory means for storing the retrieving order decided by said deciding means; and control means for selecting, for each information request, the storing medium corresponding to that information request from among the plurality of storing media in accordance with the retrieving order stored in said memory means, reading out information requested by that information request, and for outputting the read out information to a terminal apparatus from among the plurality of terminal apparatuses which orignated that information request, wherein, in a case where a new information request is inputted before completion of a final retrieval in the retrieving order stored in the memory means, said deciding means again classifies all information requests not yet replied to according to storing medium and again determines a retrieving order irrespective of the inputting order of the information requests.

15. An information providing method comprising the steps of:

enclosing a plurality of storing media;

taking out a desired storing medium from among the plurality of storing media;

reading out information from the storing medium taken out in said taking-out step;

receiving information requests from a plurality of terminal apparatuses, classifying, for each storing medium, identification information of desired information and identification information of terminal apparatuses, and deciding a retrieving order of the information;

storing the retrieving order; and controlling performance of said taking-out step and said reading step in accordance with the retrieving order and allowing retrieved information to be sequentially transmitted to a terminal apparatus which originated an information request for that retrieved information.

16. An information providing method for selecting desired information from a plurality of storing media and for outputting the selected information, comprising the steps of:

inputting information requests from a plurality of terminal apparatuses, classifying the information requests according to storing medium, and deciding a retrieving order of the information;

storing the retrieving order;

selecting, for each information request, the storing medium corresponding to that information request from among the plurality of storing media in accordance with the retrieving order, reading out information requested by that information request, and for outputting the read out information to a terminal apparatus from among the plurality of terminal apparatuses which orignated that information request; and in a case where a new information request is inputted before completion of a final retrieval in the retrieving order, again classifying all information requests not yet replied to according to storing medium and again determines a retrieving order irrespective of the inputting order of the information requests.

17. An information providing apparatus comprising:

enclosing means in which a plurality of storing media are enclosed;

taking-out means for taking out a desired storing medium from said enclosing means;

reading means for reading out information from the storing medium taken out by said taking-out means;

deciding means for receiving information requests from terminal apparatuses, for classifying, for each storing medium and identification information of desired information and for deciding a retrieving order of the information;

memory means for storing the retrieving order decided by said deciding means; and control means for controlling said taking-out means and said reading means in accordance with the retrieving order stored in said memory means and for allowing retrieved information to be sequentially transmitted to the terminal apparatus.

18. An information providing apparatus for selecting desired information from a plurality of storing media and for outputting the selected information, comprising:

deciding means for inputting information requests from a terminal apparatus, for classifying the information requests according to storing medium, and for deciding a retrieving order of the information;

memory means for storing the retrieving order decided by said deciding means; and control means for selecting, for each information request, the storing medium corresponding to that information request from among the plurality of storing media in accordance with the retrieving order stored in said memory means, reading out information requested by that information request, and for outputting the read out information to the terminal apparatus, wherein, in a case where a new information request is inputted before completion of a final retrieval in the retrieving order stored in the memory means, said deciding means again classifies all information requests not yet replied to storing medium and again determines a retrieving order irrespective of the inputting order of the information request.

19. An information providing method comprising the steps of:

enclosing a plurality of storing media;

taking out a desired storing medium from among the plurality of storing media;

reading out information from the storing medium taken out in said taking-out step;

receiving information requests from a terminal apparatus, classifying, for each storing medium and identification information of desired information, and deciding a retrieving order of the information;

storing the retrieving order; and controlling performance of said taking-out step and said reading step in accordance with the retrieving order and allowing retrieved information to be sequentially transmitted to the terminal apparatus.

20. An information providing method for selecting desired information from a plurality of storing media and for outputting the selected information, comprising the steps of:

inputting information requests from a terminal apparatus, classifying the information requests according to storing medium, and deciding a retrieving order of the information;

storing the retrieving order;

selecting, for each information request, the storing medium corresponding to that information request from among the plurality of storing media in accordance with the retrieving order, reading out information requested by that information request, and for outputting the read out information to the terminal apparatus; and in a case where a new information request is inputted before completion of a final retrieval in the retrieving order, again classifying all information requests not yet replied to according to storing medium and again determines a retrieving order irrespective of the inputting order of the information request.

* * * * *

UNITED STATES PATENT AND TRADEMARK OFFICE
CERTIFICATE OF CORRECTION

PATENT NO.    : 6,149,317
DATED         : November 21, 2000
INVENTOR(S)   : Ikuo Watanabe It is certified that error appears in the above-identified patent and that said Letters Patent is hereby corrected as shown below:

Title page,
Item [57], ABSTRACT,
"means" should read -- unit --.

Column 2,
Line 59, "switching unit" should read -- switching device --.

Column 3,
Line 49, "there is" should be deleted;
Line 51, "means" should read -- device --; and
Line 53, "which requested" should read -- which made the request --.

Column 4,
Line 27, "a unit" should read -- a unit 23 --; and
Line 28, "23" should be deleted.

Column 5,
Line 20, "by recording" should read -- by a recording --.

Column 6,
Line 2, "exist," should read -- exists, --;
Line 59, "Plurality" should read -- plurality --; and
Line 63, "originated" should read -- which originated --.

Column 7,
Line 19, "stsoring" should read -- storing --; and
Line 30, "origi-" should read -- which origi --.

UNITED STATES PATENT AND TRADEMARK OFFICE
CERTIFICATE OF CORRECTION

PATENT NO. : 6,149,317
DATED : November 21, 2000
INVENTOR(S) : Ikuo Watanabe

It is certified that error appears in the above-identified patent and that said Letters Patent is hereby corrected as shown below:

<u>Column 8,</u>
Line 27, "retrieving-order" should read -- retrieving order --; and
Line 40, "mediums" should read -- medium, --.

Signed and Sealed this

Second Day of April, 2002

*Attest:*

*Attesting Officer*

JAMES E. ROGAN
*Director of the United States Patent and Trademark Office*